(No Model.) 2 Sheets—Sheet 2.
W. RAYDT.
IMPREGNATING AND FILTERING APPARATUS.

No. 576,792. Patented Feb. 9, 1897.

Witnesses
Inventor.
Wilhelm Raydt.

United States Patent Office.

WILHELM RAYDT, OF STUTTGART, GERMANY.

IMPREGNATING AND FILTERING APPARATUS.

SPECIFICATION forming part of Letters Patent No. 576,792, dated February 9, 1897.

Application filed January 17, 1896. Serial No. 575,882. (No model.)

*To all whom it may concern:*

Be it known that I, WILHELM RAYDT, doctor of philosophy, residing at 195 Silberburgstrasse, Stuttgart, Würtemberg, Germany, have invented certain new and useful Improvements in Impregnating and Filtering Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The filtration of liquids and the charging or impregnation of the same with a gas or a gaseous compound has heretofore been effected in separate apparatuses; and my present invention has for its object the provision of means whereby liquid may be charged or impregnated with a gas or a gaseous compound and filtered in one and the same apparatus and in a continuous manner.

It has for its further object the provision of means whereby the liquid to be filtered is first brought in contact with the gas in a more or less finely-divided state and in the provision of means whereby the supply of liquid to be filtered is automatically regulated in accordance with the outflow of the filtrate, and whereby the whole of the filtering area is at all times during the operation of the filter made use of.

Figure 1:
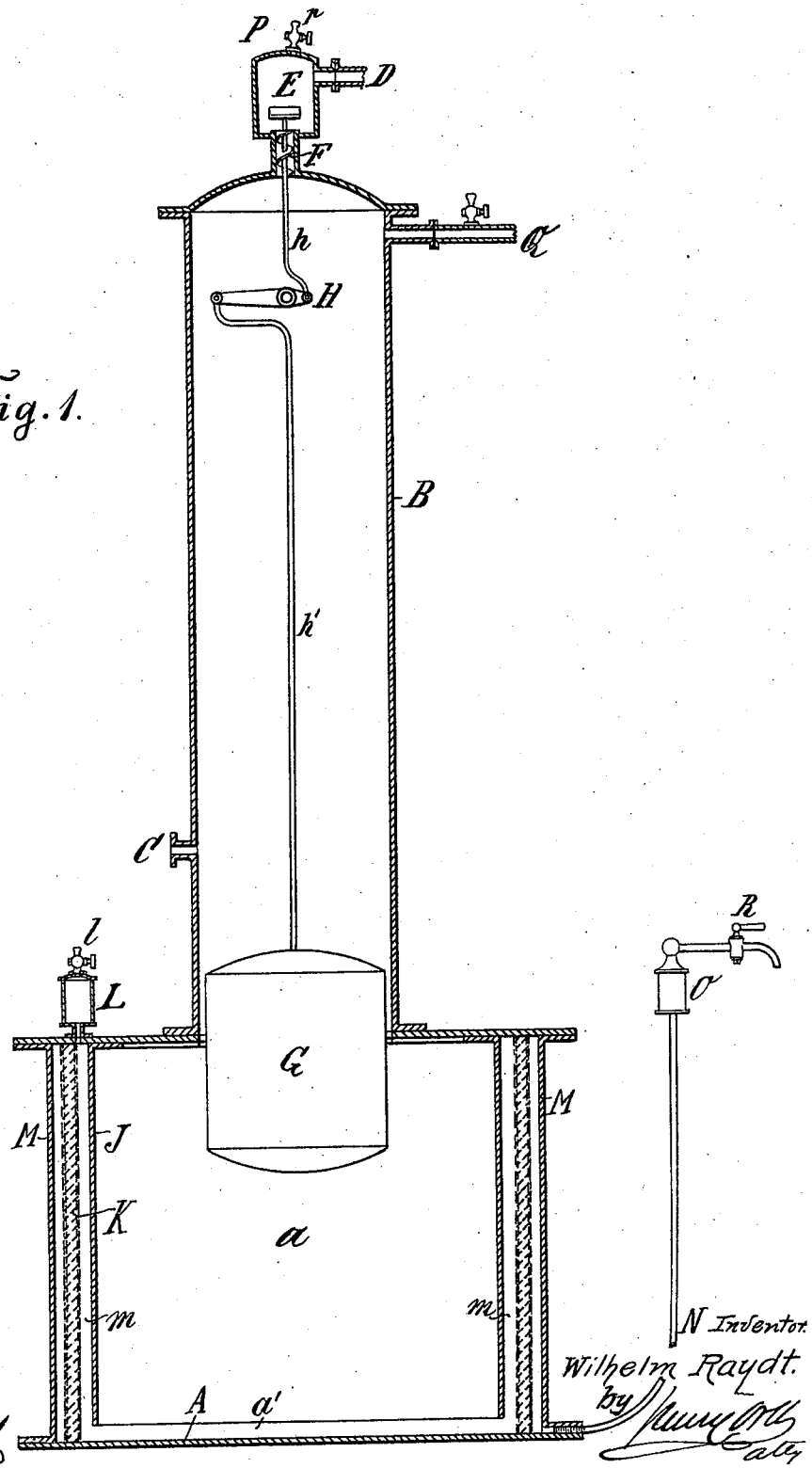
Figure 2:
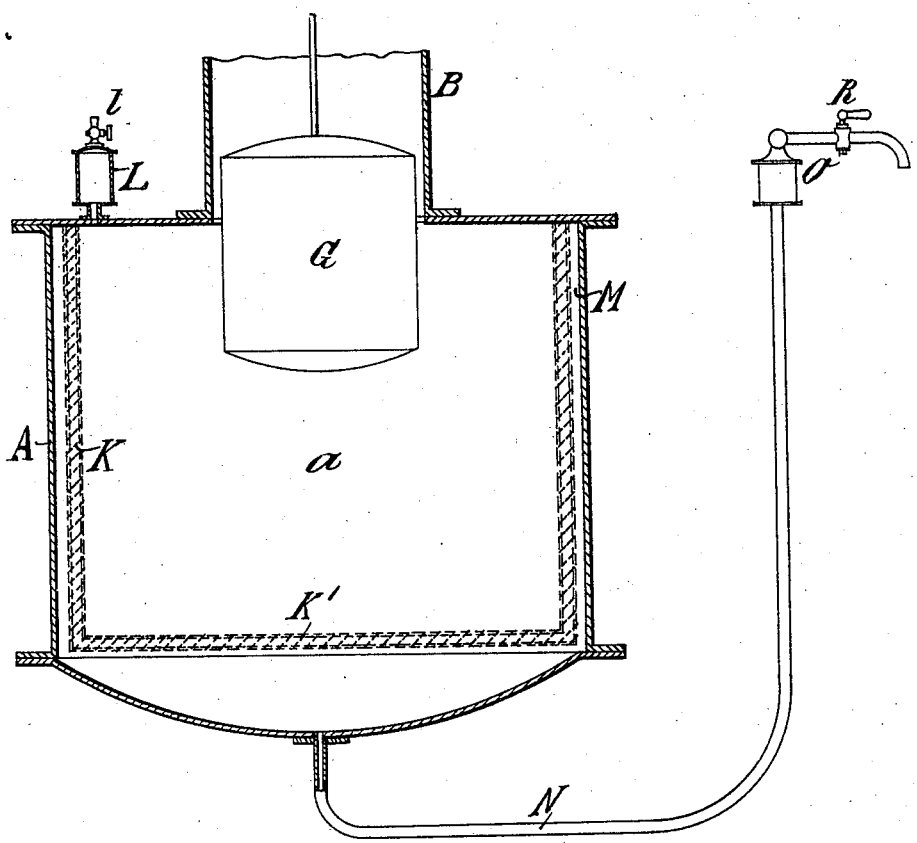

In the accompanying drawings, Figure 1 is a vertical sectional view of a filtering and impregnating apparatus embodying my invention; and Fig. 2 is a similar view of the lower portion thereof, illustrating a modification in the construction of the filter portion of the apparatus whereby the filtering area may be materially increased.

In the above drawings I have shown the filter and its impregnating or charging column of cylindrical form in cross-section; but I do not desire to limit myself to this form, as they may be of polygonal or other form in cross-section, according to desire or conditions of service.

The filter consists of a vessel A, divided by a partition J into two concentric chambers, the inner larger chamber $a$ being the receiving-chamber, while the outer narrow chamber constitutes the filtering-chamber and is divided into two concentric chambers $m$ and M by a suitable filtering medium, as, for instance, a filtering material K of any desired kind or suitable to the filtration of a particular liquid.

In order that the liquid in the receiving-chamber may readily rise in chamber $m$, the partition J is of such height as not to extend to the bottom of the vessel A, thus leaving a passage $a'$ between the lower edge of said partition and the bottom of the vessel A, as shown in Fig. 1. The liquid within the receiving-chamber rising in chamber $m$ passes through the filtering medium into the filtrate-chamber M.

To the last-named chamber, at or near the bottom of vessel A, is connected the discharge-pipe N, which is extended upwardly above the top or roof of vessel A and provided near its outlet with a suitable stop-cock R and with a sight-glass O for purposes well understood, a sight-glass L being also secured to the cover for the filter and in communication with the chamber $m$ between the filtering medium and the partition J, which sight-glass is preferably provided at top with an air-vent or stop-cock $l$.

The partition J may be dispensed with and the filtering area materially increased by giving to the bottom of the vessel A a concave form and placing thereon a filtering medium K', as shown in Fig. 2.

If desired, a special level-indicator may be connected with chamber $m$ instead of the sight-glass L, and a non-transparent air-collecting cylinder substituted for said sight-glass L and provided with a suitable air-outlet valve.

An impregnating or charging column B rises centrally from the filter-vessel A, and has at its upper end a narrow inlet-passage extending into a small cylinder or sight-glass P, the inlet to said passage forming a seat for a disk valve E, connected by rod $h$ to the short arm of a rock-lever H, whose longer arm is connected by rod $h'$ with a float G, that has motion in the outlet of column B and projects into the receiving-chamber $a$ of the filter. Near its lower end the column has a gas-inlet branch C, connected with a suitable source of gas-supply, (not shown,) as, for instance, a reservoir for carbonic acid, a suitable regulating valve or cock being provided in said connection, and near its upper end said column B has an air-outlet branch Q, also provided with a suitable valve or stop-cock.

The sight-glass P has an air-vent controlled by a stop-cock $p$, and an inlet branch D connected with a source of liquid-supply, (not shown,) and through which the liquid enters the apparatus under sufficient pressure. In the narrow passage between the sight-glass P and column B, I provide means for more or less finely dividing the liquid to be filtered and flowing under a sufficient head or pressure into the sight-glass P, as, for instance, a spiral path F, whereby a gyrating motion is imparted to the liquid as it escapes from said passage and whereby such liquid is finely divided or sprayed and brought into intimate contact with the ascending carbonic-acid gas, which latter is rapidly absorbed by the finely-divided liquid, a thorough impregnation or charging of such liquid being effected before it reaches the receiving-chamber $a$ of the filter.

In starting the apparatus the stop-cocks in the sight-glasses L P and in the pipes Q and N can be opened and the air contained in the apparatus can be allowed to escape or can be driven out by admitting carbonic acid to the apparatus. In other respects the operation of said apparatus will be readily understood. It will also be understood that as the filter fills with liquid the float G rises, and when such filter is full the valve E is closed by the action of the float on the rock-lever H. When the level of the liquid falls and with it the float G, the valve E is unseated and admits liquid to the column B and filter, so that the supply of liquid to be impregnated or charged with carbonic acid or other gas or gaseous compound is automatically regulated in accordance with the discharge of the gas impregnated or charged filtrate. On the other hand, the automatic supply-regulating devices and the arrangement of the discharge for the filtrate above the top of the filter-casing insure the use of the whole of the filtering area, as will be readily understood.

The column B is of course of a suitable height to insure the complete impregnation with the gas of the more or less finely-divided liquid during its fall down said column.

Having thus described my invention, what I claim as new therein, and desire to secure by Letters Patent, is—

1. A combined filter and impregnating or charging apparatus, comprising a filter, an impregnating or charging column in communication with the filter, a gas-inlet and an inlet for liquid at or near the foot and head of the column respectively, and a valve interposed between the inlet for liquid and the inlet to the column, a float in the passage leading from the column to the receiving-chamber of the filter, a two-armed rock-lever, to the arms of which said float and valve are connected, for the purposes set forth.

2. The combination with the filter-casing, a filtering medium arranged therein so as to form a chamber for the filtrate surrounding said filtering medium, and a valved discharge-pipe connected with the filtrate-chamber at or near its lowermost level, and having its outlet above the top of the filter-casing; of an impregnating or charging column rising from and opening into the filter within the space encompassed by the filtering medium, a gas-inlet and an inlet for liquid arranged respectively at or near the foot and head of said column, and level-indicators connected with the filter and discharge-pipe for the purpose set forth.

3. The combination with the filter-casing, a filtering medium arranged therein to form a receiving-chamber, and a chamber for the filtrate respectively surrounded by and surrounding the said filtering medium, and a discharge-pipe having its outlet above the top of the filter and its inlet connected with the filtrate-chamber at or near the foot thereof; of an impregnating or charging column rising from the filter and opening into its receiving-chamber, inlets for gas and liquid located respectively at or near the foot and head of said column, a valve interposed between the inlet for liquid and its outlet into the column, and a float in the passage leading from the column to the aforesaid receiving-chamber of the filter, said float controlling the aforesaid valve, for the purpose set forth.

4. The combination with the filter-casing, a filtering medium arranged therein to form a chamber for the filtrate surrounding said filtering medium, and a receiving-chamber surrounded by said medium, an air-vent in communication with the head of the receiving-chamber, and a discharge-pipe in communication with the foot of the filtrate-chamber, said pipe provided with a level-indicator, said indicator and the outlet of said pipe located above the head of both chambers; of an impregnating or charging column rising from the filter and opening into its receiving-chamber, a gas-inlet, and an inlet for the liquid arranged respectively at or near the foot and head of said column, a sight-glass interposed between said inlet for liquid and inlet to the column, a valve-seat at the outlet of said sight-glass, a valve controlling said outlet and a float in the receiving-chamber of the filter connected with and controlling said valve, substantially as and for the purpose set forth.

In testimony that I claim the foregoing as my invention I have signed my name in presence of two subscribing witnesses.

WILHELM RAYDT.

Witnesses:
G. HOLSTE,
CHRISTIAN BAUER.